US010445565B2

(12) United States Patent
Tu et al.

(10) Patent No.: US 10,445,565 B2
(45) Date of Patent: Oct. 15, 2019

(54) CROWD ANALYTICS VIA ONE SHOT LEARNING

(71) Applicant: General Electric Company, Schenectady, NY (US)

(72) Inventors: Peter Henry Tu, Niskayuna, NY (US); Tao Gao, Niskayuna, NY (US); Jilin Tu, Schenectady, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 55 days.

(21) Appl. No.: 15/370,746

(22) Filed: Dec. 6, 2016

(65) Prior Publication Data

US 2018/0157903 A1    Jun. 7, 2018

(51) Int. Cl.
*G06K 9/00* (2006.01)
*G06T 7/246* (2017.01)
*H04N 7/18* (2006.01)

(52) U.S. Cl.
CPC ....... *G06K 9/00335* (2013.01); *G06K 9/0061* (2013.01); *G06K 9/00315* (2013.01); *G06K 9/00342* (2013.01); *G06K 9/00758* (2013.01); *G06K 9/00771* (2013.01); *G06K 9/00778* (2013.01); *G06T 7/248* (2017.01); *H04N 7/183* (2013.01); *G06T 2207/30201* (2013.01); *G06T 2207/30232* (2013.01)

(58) Field of Classification Search
CPC ........... G06K 9/00335; G06K 9/00315; G06K 9/00342; G06K 9/0061; G06K 9/00758; G06K 9/00771; G06K 9/00778; G06T 7/248
See application file for complete search history.

(56) References Cited

U.S. PATENT DOCUMENTS

| 5,479,523 A | 12/1995 | Gaborski et al. |
| 6,850,252 B1 * | 2/2005 | Hoffberg ............ G06K 9/00369 348/E7.061 |
| 7,036,094 B1 | 4/2006 | Cohen et al. |
| 7,295,687 B2 | 11/2007 | Kee et al. |
| 8,195,499 B2 * | 6/2012 | Angell ............... G06Q 10/0631 705/7.29 |
| 8,331,656 B2 | 12/2012 | Baker |
| 8,521,669 B2 | 8/2013 | Knoblauch |
| 8,548,192 B2 * | 10/2013 | Zhang ................ G06K 9/00751 375/240 |
| 9,639,770 B2 * | 5/2017 | Paradkar ........... G06F 16/24578 |
| 2005/0047647 A1 | 3/2005 | Rutishauser et al. |

(Continued)

FOREIGN PATENT DOCUMENTS

CN    101667245 B    8/2011

OTHER PUBLICATIONS

Guo, H. et al., "Face verification using large feature sets and one shot similarity," International Joint Conference on Biometrics (IJCB), pp. 1-8 (Oct. 11-13, 2011).

(Continued)

*Primary Examiner* — Utpal D Shah
(74) *Attorney, Agent, or Firm* — Fletcher Yoder, P.C.

(57) ABSTRACT

Provided are techniques for assessing individual or crowd level behavior based on image data analysis. For example, in one embodiment, the techniques may include generating signatures representative of an observed behavior based on video data and performing pairwise matching by determining whether the first signature matches a second signature indicative of a query behavior.

20 Claims, 7 Drawing Sheets

(56) References Cited

U.S. PATENT DOCUMENTS

| | | | |
|---|---|---|---|
| 2009/0154806 A1* | 6/2009 | Chang | G06K 9/00758 382/173 |
| 2010/0104256 A1* | 4/2010 | Tsurumi | G06K 9/00335 386/241 |
| 2012/0250982 A1* | 10/2012 | Ito | G06T 7/194 382/159 |
| 2012/0310591 A1* | 12/2012 | Win | G01C 21/165 702/150 |
| 2013/0173504 A1* | 7/2013 | Tu | G06N 20/00 706/12 |
| 2014/0119608 A1* | 5/2014 | Lee | G06K 9/00771 382/103 |
| 2014/0214383 A1* | 7/2014 | Haas | G06F 17/5009 703/6 |
| 2015/0282766 A1* | 10/2015 | Cole | A61B 5/7267 702/139 |
| 2016/0124071 A1 | 5/2016 | Baxley et al. | |
| 2016/0142679 A1* | 5/2016 | Miyoshi | H04N 7/18 348/159 |
| 2016/0171293 A1* | 6/2016 | Li | G06K 9/00355 382/103 |
| 2017/0358154 A1* | 12/2017 | Ishikawa | G06N 5/04 |
| 2018/0157902 A1* | 6/2018 | Tu | G06K 9/00335 |

OTHER PUBLICATIONS

Yang,Y. et al., "Discovering Motion Primitives for Unsupervised Grouping and One-Shot Learning of Human Actions, Gestures, and Expressions," IEEE Transactions on Pattern Analysis and Machine Intelligence, vol. 35, Issue No. 7, pp. 1635-1648 (Jul. 2013).

Extended European Search Report and Opinion issued in connection with corresponding EP Application No. 17194461.4 dated May 4, 2018.

* cited by examiner

RANK MATRIX

| | | | | | | | | | | | | | |
|---|---|---|---|---|---|---|---|---|---|---|---|---|---|
| 006 | 011 | 004 | 002 | 003 | 009 | 005 | 010 | 001 | 008 | 013 | 012 | 007 |
| 004 | 001 | 007 | 012 | 008 | 005 | 006 | 002 | 010 | 011 | 003 | 003 | 009 |
| 006 | 009 | 002 | 010 | 007 | 008 | 004 | 005 | 011 | 012 | 001 | 013 | 003 |
| 007 | 012 | 008 | 003 | 005 | 009 | 001 | 008 | 004 | 006 | 013 | 011 | 010 |
| 008 | 012 | 004 | 005 | 002 | 013 | 007 | 010 | 003 | 009 | 006 | 011 | 001 |
| 006 | 013 | 003 | 011 | 008 | 002 | 004 | 012 | 010 | 001 | 005 | 007 | 009 |
| 008 | 013 | 004 | 009 | 007 | 002 | 003 | 012 | 010 | 001 | 006 | 005 | 011 |
| 008 | 002 | 004 | 013 | 005 | 012 | 007 | 006 | 009 | 010 | 011 | 003 | 001 |
| 008 | 002 | 001 | 012 | 007 | 004 | 002 | 003 | 010 | 009 | 011 | 013 | 006 |
| 004 | 005 | 003 | 011 | 008 | 002 | 002 | 006 | 007 | 001 | 009 | 011 | 013 |
| 006 | 012 | 004 | 009 | 009 | 002 | 006 | 003 | 010 | 007 | 011 | 005 | 013 |
| 003 | 004 | 005 | 012 | 004 | 013 | 008 | 002 | 011 | 007 | 013 | 005 | 010 |
| 010 | 008 | 006 | 003 | 010 | 007 | 012 | 002 | 009 | 005 | 011 | 001 | 001 |

CROWD ANALYTICS VIA ONE SHOT LEARNING

STATEMENT REGARDING FEDERALLY SPONSORED RESEARCH & DEVELOPMENT

This invention was made with Government support under contract number 2013-11-CX-K010 awarded by the National Institute of Justice of the United States Department of Justice. The Government has certain rights in the invention.

BACKGROUND

The subject matter disclosed herein relates to crowd analytics via one shot learning.

Understanding individual or crowd level behavior is an important field of study and may lead to behavior detection. Detecting a person's behavior may enable crime reduction and/or enhanced security in various locations where crowds typically gather, such as airports, train stations, sporting arenas, movie theaters, and the like. It is now generally recognized that improved techniques to detect a behavior prior to a person carrying out that behavior is desirable.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the present disclosure. Indeed, the disclosed techniques may encompass a variety of forms that may be similar to or different from the embodiments set forth below.

In one embodiment, a method is provided that includes the steps of receiving data from one or more cameras in an environment; generating metadata of one or more video analytics streams produced from the data; generating one or more time series of values based on the metadata; generating one or more affect scores for the one or more time series; generating a first signature representative of an observed behavior based on the one or more affect scores; performing pairwise matching by determining whether the first signature matches a second signature indicative of a query behavior; and performing an action when the first signature matches the second signature.

In another embodiment, a tangible, non-transitory computer-readable media is provided. The tangible, non-transitory computer-readable media stores computer instructions that, when executed by one or more processors, cause the one or more processors to: receive data from one or more cameras in an environment; generate metadata of one or more video analytics streams produced from the data; generate one or more time series of values based on the metadata; generate one or more affect scores for the one or more time series; generate a first signature representative of an observed behavior based on the one or more affect scores; perform pairwise matching by determining whether the first signature matches a second signature indicative of a query behavior; and provide an output when the first signature matches the second signature indicative of the query behavior.

In another embodiment, a system is provided that includes one or more cameras that capture data related to a behavior of one or more individuals in an environment. The system also includes one or more computing devices comprising one or more processors that receive the data from the one or more cameras; perform one shot learning using the data to determine whether an observed behavior of the one or more individuals matches a query behavior, wherein one shot learning comprises performing pairwise matching that is performed after only a single observation of an instance of the query behavior is obtained; and perform an action when the observed behavior matches the query behavior.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements.

Embodiments of the present disclosure generally relate to a one shot learning framework for behavior recognition. One shot learning permits recognition of a behavior category or type on the basis of one or only a few behavior observations. Given a single observation of an instance of a query behavior (such as loitering), the social behavior recognition system may classify any subsequent observations as either being another example of this class or not. From a recognition perspective the techniques may be akin to the problem of face recognition, where at any time the system receives data representing two faces, the system decides whether or not the two faces came from the same individual or from a different individual. Similarly a one shot behavior recognition system is disclosed herein that compares any pair of observed behaviors and determines whether or not the two behaviors are the same or not.

Some embodiments may enable understanding crowd level behaviors using stand-off video analytic methods. In particular, a social behavior recognition system may be used to capture and analyze non-verbal cues of persons in individual and/or crowd/group level interactions. Further, a one shot learning approach may be used by the social behavior recognition system based on the concept that a new behavior may be recognized with as little as a single example. The social behavior recognition system may implement methods such as person tracking in crowds, dynamic pan-tilt-zoom (PTZ) camera control, facial analytics from a distance (e.g., gaze estimation and/or expression recognition), upper body affective pose analysis, and inference of social states (e.g., rapport, hostility, etc.). In some embodiments, the cues derived by the social behavior recognition system may be used to construct semantically meaningful behavior descriptors or affects allowing for signature matching between behaviors which can be viewed as a form of one shot learning.

In certain embodiments, the terms used herein may be understood as follows:

One shot learning: given a single observation of an instance of a query behavior (such as group formation), classifying whether any subsequent observations are either another example of this class or not.

Behaviors: sequences of events that are performed by people.

Video analytic streams: data that is generated by base video analytics such as the location, gaze direction, expression, and/or motion field of each person (these may be under constant development)

Signal generators: various interpretations of the data such as the observation of events as well as measured quantities. Signal generators may be parameterized and may be viewed as a single variable time series between 0 and 1.

Affects: semantically meaningful descriptors of behaviors; a signal generator may produce a single affect score between 0 and 1.

Signatures: structures used to characterize a behavior. Signatures encode the observed affects. The signatures may also consider when each affect was observed because the sequence of affects may aid in behavior detection.

Observation of a behavior: composed of a raw video plus a video analytic stream.

Figure 1:
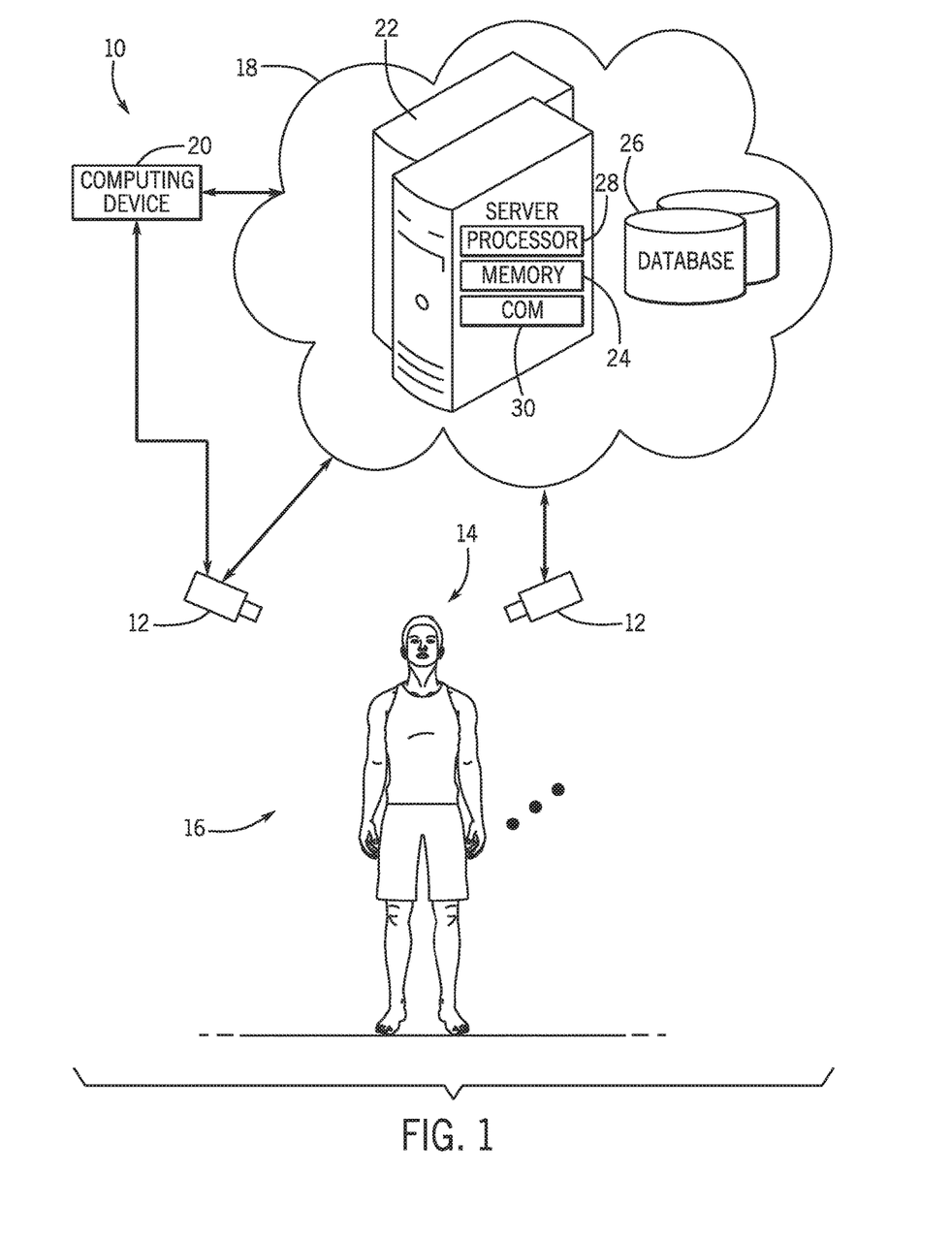
FIG. 1 is an illustration of a social behavior recognition system, in accordance with an embodiment.

With the foregoing in mind, FIG. 1 is an illustration of a social behavior recognition system 10, in accordance with an embodiment. The social recognition system 10 may consider a wide variety of visual cues, such as facial expression, gaze direction, body posture and motion, among others. Based on the visual cues, the social recognition system 10 may estimate complex group level social states in a completely automated fashion. In some embodiments, the social behavior recognition system 10 may evaluate social interaction analysis as a latent variable inference problem. Further, in some embodiments, the social behavior recognition system 10 may include cameras 12 that capture data about one or more people 14 functioning freely in unconstrained environments 16. The social recognition system 10 may be used as the source of video analytic metadata. As described more fully below, the social behavior recognition system 10 may be instantiated as a real-time, stand-off or stand-alone (e.g., separate from the individuals) end-to-end social interaction analysis system.

As depicted, the social behavior recognition system 10 includes one or more cameras 12 enabled to capture still images, video, or both. The cameras 12 may be installed in any suitable location of the unconstrained environment 16, such as on a wall, ceiling, floor, or the like. One or more cameras 12 may be implemented as body cameras. Further, the system 10 may also be capable of using outside cameras 12 as a data source. For example, the system 10 may be configured to obtain social media images or videos from the environment as input data to the video analytics. The unconstrained environment 16 may include one or more people 14. For example, there may be a single individual person 14 present in the environment 16 or a crowd of people 14 may be present in the environment 16. The cameras 12 may be programmed or controlled to capture data related to the people 14. In some embodiments, the cameras 12 may be communicatively coupled to a cloud-based computing system 18 and/or a computing device 20. As such, the cameras 12 may transmit obtained data to the cloud-based computing system 18 and/or the computing device 20. The frequency of transmission may be periodically (e.g., every minute, 5 minutes, 30 minutes, 60 minutes, day, week, etc.) or streaming (e.g., continuous in real-time or near real-time). In some embodiments, the computing device 20 may be implemented as or accessible by a smartphone, a smartwatch, a tablet, a laptop computer, a desktop computer, or the like.

The data obtained via the cameras 12 may be received by one or more servers 22 of the cloud-based computing system 18 and stored in one or more memories 24 of the servers 22 or in one or more databases 26 included in the cloud-based computing system 18 that are external to the servers 22. The servers 22 may be communicatively coupled to each other and may distribute various tasks between each other to perform the tasks more efficiently. The servers 22 may also include one or more processors 28 and a communication component 30. The communication component 30 may be a wireless or wired communication component that may facilitate communication between the cloud-based computing system 18, the cameras 12, and/or the computing device 20.

The processor 28 may be any type of computer processor or microprocessor capable of executing computer-executable code. The processor 28 may also include multiple processors that may perform the operations described below. The memory 24 may be any suitable articles of manufacture that can serve as non-transitory media to store processor-executable code, data, analysis of the data, or the like. These articles of manufacture may represent computer-readable media (e.g., any suitable form of memory or storage) that may store the processor-executable code used by the processor 28 to perform the presently disclosed techniques. Generally, the processor 28 may recognize behavior based on data obtained via the cameras 12, as described in detail below. Due to the distributed nature of the servers 22 in the cloud-based computing system 18, the shared resources of the servers 22 enable parallel processing to enable real-time feedback. For example, each server 22 may be responsible for processing a different portion of the data at substantially the same time and the results may be collected by a single server 22 that combines the results and outputs the results to the computing device 20. In this way, no one server 22 is inundated with a computationally expensive task and the processing time may be reduced.

The databases 26 may store the image and/or video data captured by the cameras 12. Also, the databases 26 may store other information, such as known behavior signatures that can be compared against the video analytic stream metadata to determine whether there is a behavior match. Further, the databases 26 and/or the memory 24 may store historical video and/or image data obtained by the cameras 12.

The computing device 20 may store an application that provides a graphical user interface (GUI) that displays whether a certain behavior of one or more people 14 is detected, as well as any relevant information related to the people 14 and/or actions (e.g., call emergency services, sound alarm, trigger alert, send message, display alert, etc.) to be taken. That is, in some embodiments, the application may not perform any processing, such as methods for recognizing behavior. Instead, in some embodiments, the application may just function as a front-end display of data and results of the behavior recognition techniques performed by the cloud-based computing system 18. For example, in a client-server architecture, a website may be accessed via a browser on the computing device 20 and the website may function as a thin-client in that it just displays information provided by the cloud-based computing system 18 without actually performing any modeling. However, in some embodiments, the application stored on the computing device 20 may receive the data from the cameras 12 and perform the behavior recognition techniques disclosed herein.

Although the components described above have been discussed with regard to the servers 22 of the cloud-based computing system 18, it should be noted that similar components may make up the computing device 20. Further, it should be noted that the listed components are provided as example components and the embodiments described herein are not to be limited to the components described with reference to FIG. 1.

The cameras 12 may include fixed red, green, blue, and depth (RGB+D) cameras, which produce estimates of location and articulated body motion. Also, the cameras 12 may include pan-tilt-zoom (PTZ) cameras that may be tasked based on such tracking results to capture high resolution facial imagery. Facial landmark fitting and tracking is performed so as to extract facial expressions and gaze directions. The social behavior recognition system 10 may distill a stream of person-specific cues into a set of site-level aggregate statistics which are independent of the configuration and number of observed individuals. Such measures may include emotional affect (derived from observed facial expressions), proximity (derived from tracked positions), activity motion (derived from motions), and engagement (derived from position and gaze direction). The social behavior recognition system 10 may continuously generate these statistics resulting in a time-series representation. Sets of graphical models may be used by the cloud-based computing system 18 and/or the computing device 20 to process these measures, thereby resulting in a continuous estimate of various group-level social states such as rapport and hostility.

It should be noted that the social behavior recognition system 10 may include a modular design for its system architecture. In some embodiments, components of the social behavior recognition system 10 may consume inputs such as raw video feeds from the cameras 12 and metadata generated by other modules. In turn, each module may generate metadata that is inserted into a message-passing publish and subscribe architecture. Using multiple computing platforms, the real-time social behavior recognition system 10 may include multi-camera tracking, PTZ control, facial analysis, data-consolidation, and social-state inference. This type of modular design may enable the incorporation of multiple third party capabilities into the social behavior recognition system 10.

One or more processors of the cloud-based computing system 18 and/or the computing device 20 may execute various modules that are implemented as computer instructions. The modules may include a tracking module, an articulated motion analysis module, a PTZ camera control module, a facial analysis module, and/or an inference module.

Starting with the tracking module, a detect-and-track paradigm may be used to estimate the location and trajectory of each subject (e.g., people 14) that are located in a specific region of interest (e.g., environment 16). Multiple RGB+D cameras 12 may be initially calibrated with respect to a world coordinate system. Imagery from each camera 12 may be used to independently generate a set of person detections and associated appearance signatures. These detections may be matched to existing trackers. Detections that are not associated with an existing tracker may be used to initialize a new tracker. Trackers that persistently fail to be associated with new detections may be terminated.

In addition, the cloud-based computing system 18 and/or the computing device 20 may execute the articulated motion analysis module. In addition to tracking, the RGB+D camera imagery may be used to extract motion cues referred to as "space-time-corners". These cues may be associated with a spatial histogram defined based on the measured location and height of each subject. These spatial/frequency distributions may be used as a representation of articulated motion body based on RGB imagery captured with the PTC cameras 12.

Regarding the PTZ camera control module, the location of each PTZ camera 12 may be initially measured with respect to the world coordinate system. A calibration procedure may be used to map pan (P), tilt (T), and zoom (Z) values to (X, Y, Z) coordinates in the world coordinate system such that if a face is located at (X, Y, Z) then the resulting imagery from the PTZ camera 12 may enable various forms of facial analysis. The tracking module may generate the location of each person in ground plane coordinates (X, Y). The Z value may be determined based on an estimate of subject height. An optimization algorithm may be used to automatically assign PTZ cameras 12 to tracked subjects.

Regarding the facial analysis module, given high resolution imagery generated by the PTZ cameras 12, the following operations may be performed: (1) face detectors are used to produce a bounding box of the subject's face, (2) eye detectors are used to locate the subject's eyes, (3) if both eyes are detected, a facial landmark model is fitted to the subject's face, (4) an estimate of the vertical and horizontal gaze directions may be computed based on the shape of the fitted landmark model, (5) an estimate of the horizontal eyeball location is computed allowing for detection of events such as "averted gaze", (6) the fitted landmark model may be used to synthesize a frontal view of the subject's face, and (7) gross facial expression models may be used to estimate a set of common facial expressions.

Regarding the inference module, given a stream of metadata associated with each person 14 (e.g., location, articulated motion, gaze direction, facial expression) a set of aggregate social signals may be generated. For the purposes of inferring group level social concepts such as rapport and hostility, graphical models may be used to reason over the aggregate social signals resulting in real-time estimates of the probability distribution associated with each social concept.

Figure 2:
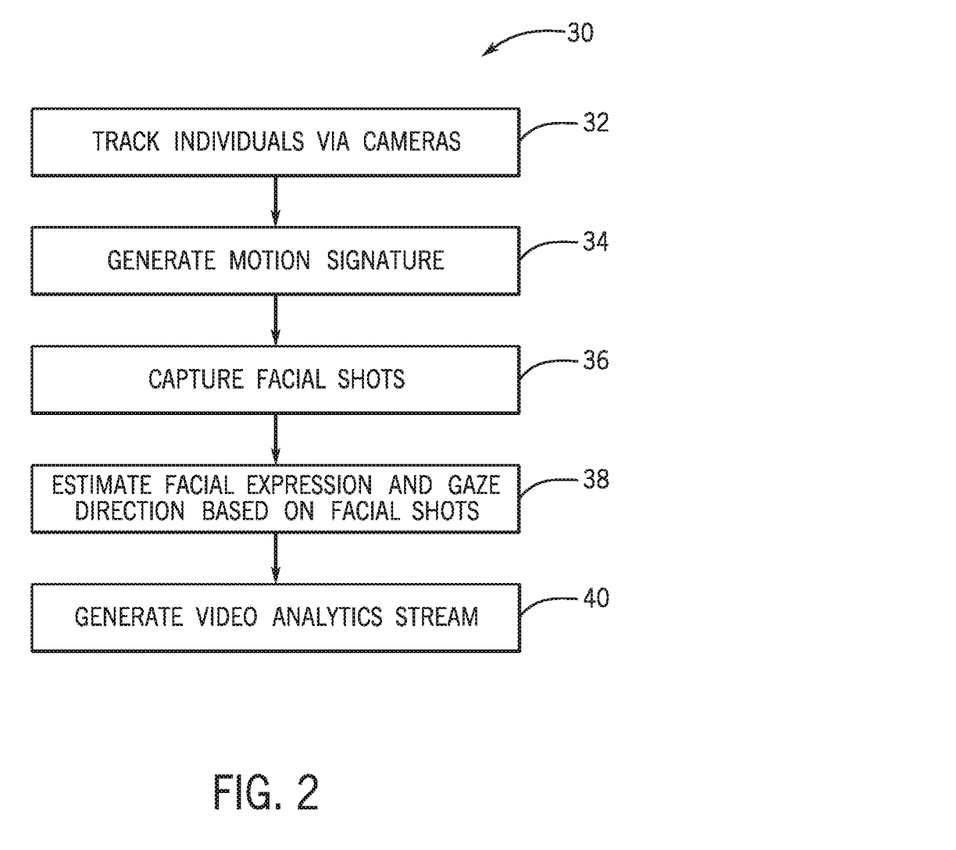
FIG. 2 is a flow diagram of a process suitable for generating a video analytics stream, in accordance with an embodiment.

FIG. 2 is a flow diagram of a process 30 suitable for generating a video analytics stream, in accordance with an embodiment. Although the following description of the process 30 is described with reference to the processor 28 of one or more servers 22 of the cloud-based computing system 18, it should be noted that the process 30 may be performed by one or more other processors disposed on other devices that may be capable of communicating with the cameras 12 and/or the cloud-based computing system 18, such as the computing device 20, or other components associated with the social behavior recognition system 10. Additionally, although the following process 30 describes a number of operations that may be performed, it should be noted that the process 30 may be performed in a variety of suitable orders and all of the operations may not be performed. It should be appreciated that the process 30 may be distributed between the servers 20 of the cloud-based computing system 18. It should be noted that various modules (e.g., tracking, articulated motion analysis, PTZ camera control, facial analysis, and/or inference) may be used to perform the process 30.

Referring now to the process 30, the processor 28 may track (block 32) individuals 14 via the PTZ cameras 12 in the environment 16. The processor 28 may also generate (block 34) a motion signature for each individual 14 based on space-time interest points. The processor 28 may also capture (block 36) high-resolution facial images by controlling the PTZ cameras 12. Also, the processor 28 may estimate (block 38) facial expression and gaze direction based on the facial images. The processor 28 may then generate (block 40) a video analytics stream. For each frame, the video analytics stream may be composed of a set of person descriptors which encode: (1) location in site coordinates, (2) a motion-signature, (3) an expression profile (joy, fear, surprise, frustration, anger), and (4) gaze direction (vertical and horizontal). In addition, each individual 14 may be linked to a prior person observation via a track ID, which may enable temporal analysis.

Figure 3:
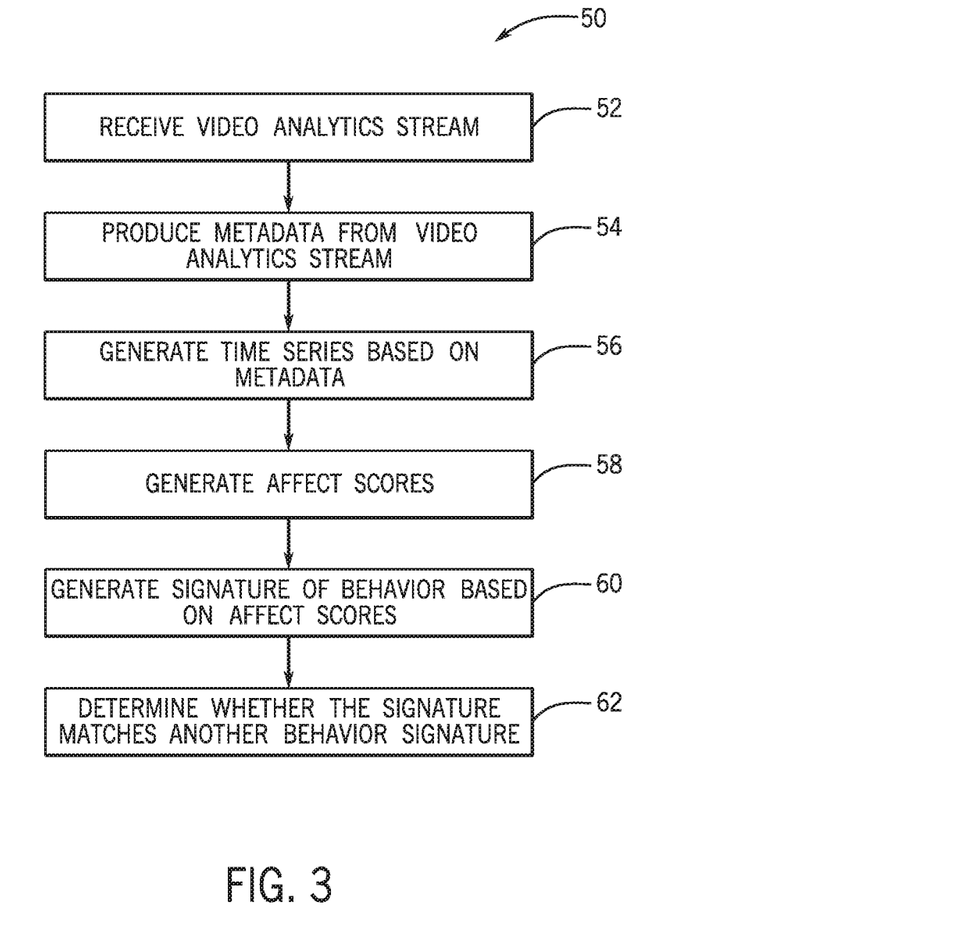
FIG. 3 is a flow diagram of a process suitable for detecting behavior via one shot learning, in accordance with an embodiment.

Using the video analytics stream, the cloud-based computing system 18 and/or the computing device 20 may perform one shot learning to determine whether a certain behavior is recognized. Accordingly, FIG. 3 is a flow diagram of a process 50 suitable for detecting behavior via one shot learning, in accordance with an embodiment. Although the following description of the process 50 is described with reference to the processor 26 of one or more servers 22 of the cloud-based computing system 18, it should be noted that the process 50 may be performed by one or more other processors disposed on other devices that may be capable of communicating with the cameras 12 and/or the cloud-based computing system 18, such as the computing device 20, or other components associated with the social behavior recognition system 10. Additionally, although the following process 50 describes a number of operations that may be performed, it should be noted that the process 50 may be performed in a variety of suitable orders and all of the operations may not be performed. It should be appreciated that, in some embodiments, the process 50 may be distributed between the servers 22 of the cloud-based computing system 18 and the computing device 20.

Referring now to the process 50, the processor 28 may receive (block 52) the video analytics stream generated above by the process 30 of FIG. 2. In some embodiments, a signal generator module may receive the video analytics stream. The processor 28 executing the signal generator module may produce (block 54) metadata from the video analytic stream. The signal generator module may also generate (block 56) a time series based on the metadata. That is, the time series may include values ranging from 0 to 1 on a per frame basis. The signal generator module may generate (block 58) an affect score ranging from 0 to 1 based on the time series. The signal generator module may include a set of parameters that define the behavior of the module. By allowing for a parametric representation for each signal generator, a user may instantiate a particular variant of a given signal generator. Conversely, multiple variants of a signal generator may be produced by considering permutations of the signal generator parameters. A signal generator bank may include numerous signal generators and enables maintaining the set of signal generators that may be used to characterize a given behavior.

Once a behavior has been processed by a signal generator module or signal generator bank, a signature is generated (block 60) based on the affect scores. In some embodiments, the signature may include the affect scores generated by each signal generator module. The signature may provide a description of a given behavior. The processor 28 may determine (block 62) whether the signature matches another behavior signature. Matching between a pair of signatures may be achieved via machine learning (e.g., supervised or unsupervised). Supervised machine learning may involve the collection of training and testing datasets composed of various enacted behaviors. The machine learning algorithms may generate a model based on pairs of behaviors that are labeled as either positive (two examples of the same type of behavior) or negative (two examples of different behaviors). The machine learning algorithm may then define the affect weights so as to discriminate between positive and negative pairs of behaviors.

Newly observed behavior may be assessed for similarity to a characteristic or query behavior such as a criminal behavior (e.g., loitering, vandalism, assault, theft, trespassing) or a pre-criminal or pre-conflict behavior (aggression) that may be matched to an observed behavior. For example, a trespassing behavior may be characteristically different than the behavior of an individual authorized to be in a location. A trespasser may exhibit characteristic gaze direction changes (e.g., looking over the shoulder for observers) relative to an authorized individual. Thus the behavior signature might include an affect associated with furtiveness. These gaze directions and their changes over time may be captured via the video analytics stream and used to generate the time series values associated with furtiveness. Another example might include a behavior associated with producing graffiti. Affects associated with this behavior might include repetitive motions (back and forth associated with the motions of a spray can) as well as an affect associated with a lookout. An observed or query behavior may also be a beneficial or altruistic behavior, such as a bystander providing medical care. The pairwise matching as provided herein may distinguish between an assault and a medical situation, even though both may yield signatures from video data analysis that indicate a prone individual and a second individual positioned over the prone individual. The distinguishing affect might be associated with the concept of concern or panic.

Figure 4:
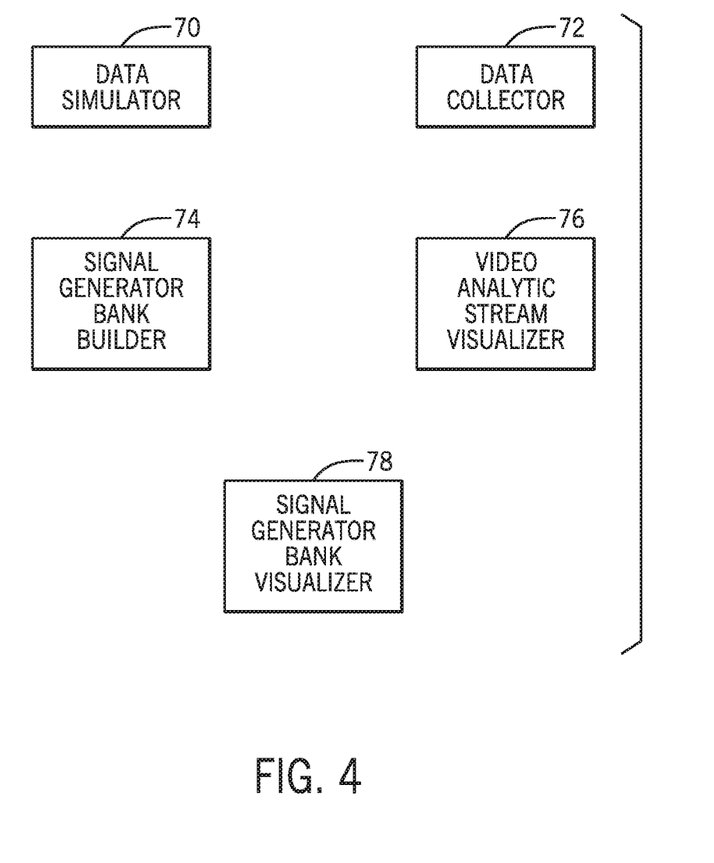
FIG. 4 is a block diagram of example modules used to perform one shot learning, in accordance with an embodiment.

FIG. 4 is a block diagram of example modules used to perform one shot learning, in accordance with an embodiment. The modules may be stored as computer instructions in the memory 24 of the servers 22 and/or of the computing device 20 and executable by the processor 28 of the servers 22 and/or of the computing device 20. The modules may include a data simulator 70 that is usable for the purposes of testing. For example, the data simulator 70 may include an agent based simulator that produces a large number of behaviors. The modules may also include a data collector 72 that may be connected to the data simulator 70 or to the social behavior recognition system 10. The data collector 72 may collect video analytic streams as well as their associated raw video data from the cameras 12.

Another module may include a signal generator bank builder 74 that enables a user to construct a signal generator bank. The user may select from an existing set of signal generator prototypes and either define a specific set of parameter settings or instruct the social behavior recognition system 10 to produce any number of permutations of a given signal generator. An initial set of signal generator prototypes may include emotion valence, gaze standard deviation, gaze engagement, location proximity, location speed, and motion magnitude.

Another module may include a video analytic stream visualizer 76 that enables a developer to visually analyze a given video analytic stream and associated raw video. This module may support the construction of new signal generators. Additionally, a signal generator bank visualizer 78 module may be used that enables a developer to visually analyze a behavior of a given signal generator with respect to an observed behavior.

Various experiments were performed using the disclosed one shot learning techniques. The experiments involved the collection of thirteen behavior pairs and the instantiation of an initial set of eighteen signal generators. More specifically, thirteen behaviors were specified and three volunteers 14 were asked to perform two versions of each behavior resulting in twenty-six observed behaviors or 13 behavior pairs. The selected behaviors were three people 14 (who know each other) just passing through, strangers passing by, a chance meeting between friends (happy), two people are waiting for a third friend (who is late for the meeting), a group forms and an argument starts and ends in a fight, two people approach a drug dealer and purchase drugs, two people are lost and ask a bystander for directions, a game of tag (one person tries to tag the others), three strangers standing around (one faints and the others try to assist), a pan-handler asks for change, a busker (juggler or musician) gets a tip, a stalker starts to follow a pair of people, and two people 14 start spray painting (graffiti) walls while one is a lookout.

A signal generator bank with eighteen signal generators was produced. This was achieved by randomly selecting three parameter settings for each of the six signal generator prototypes. Also, one shot learning was employed that produced a distance measure between any two observed behaviors. This may be enabled by producing a feature vector descriptor for each observed behavior and then computing the Euclidean distance between each feature vector descriptor. In some embodiments, the feature vector may be composed of the affect scores produced by each of the signal generators.

Figure 5:
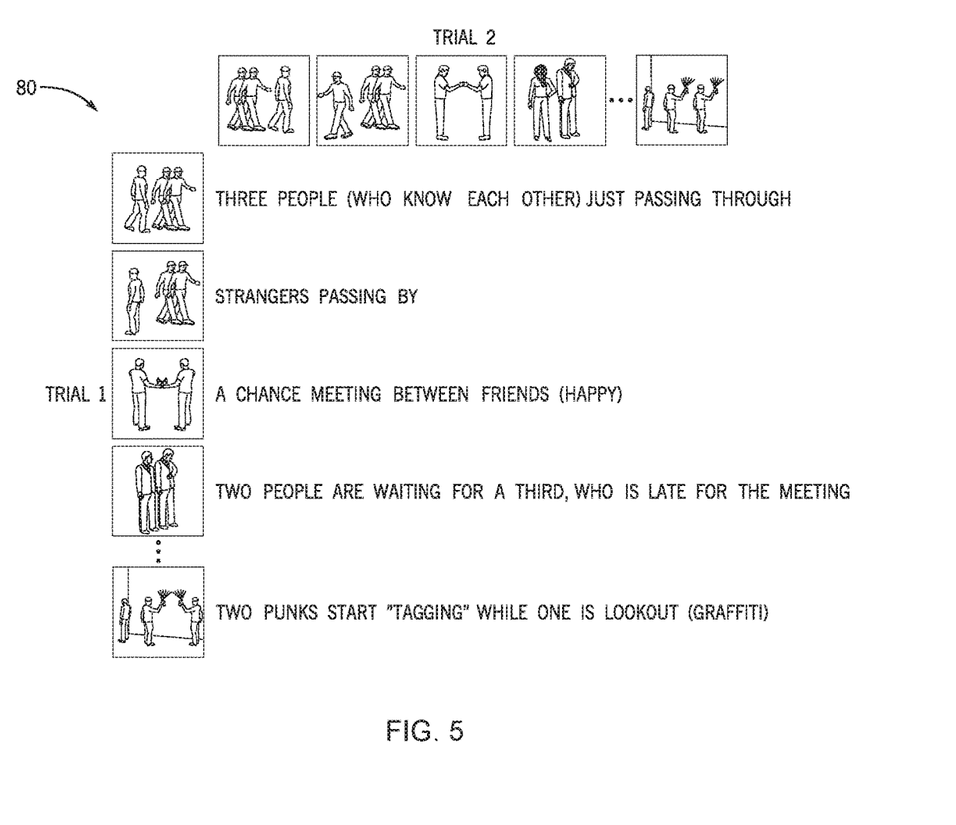
FIG. 5 is a matrix representation of thirteen behavior pairs used for one shot learning, in accordance with an embodiment.

The results of applying the initial signal generator bank to the observed test sequences can be described with reference to FIGS. 5-7. Starting with FIG. 5, a matrix representation 80 is depicted of the thirteen behavior pairs used for one shot learning, in accordance with an embodiment. As depicted, the i'th behavior is associated with the i'th row (the first trial) and the i'th column (the second trial). Using the one shot learning distance measure, the match ranking for each column to each row may be computed. Thus, optimal performance may result in a rank value of 1 across the diagonal of a rank matrix.

Figure 6:
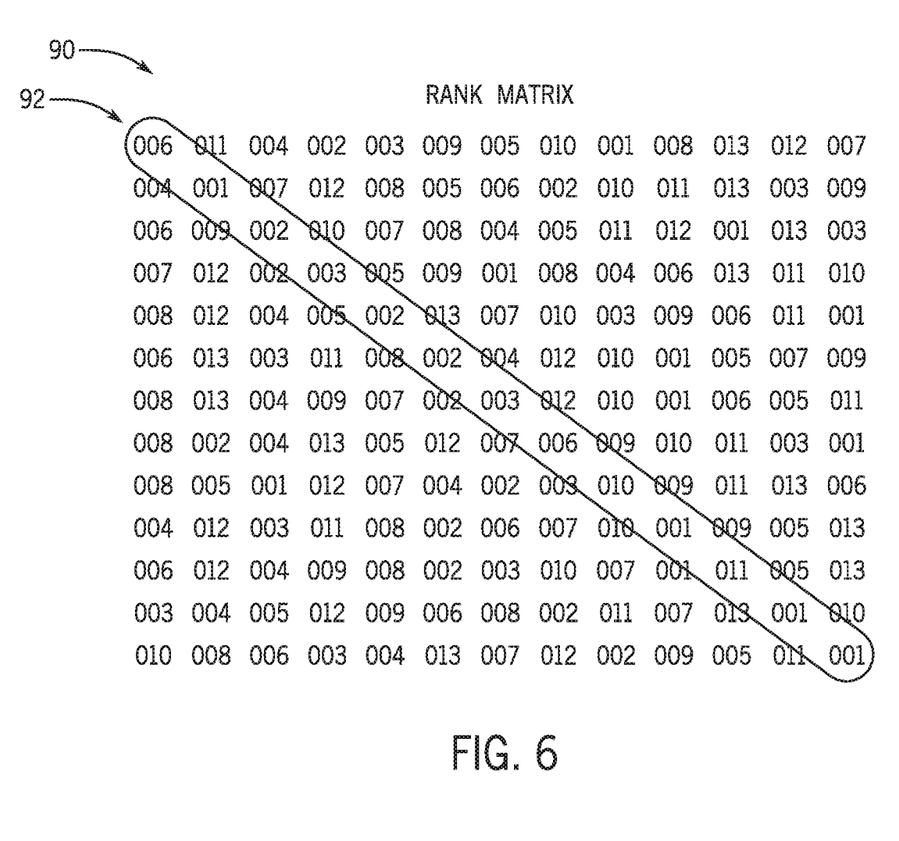
FIG. 6 is a rank matrix based on thirteen observed behavior pairs and eighteen signal generators each capable of producing an affect score for each behavior, in accordance with an embodiment.

To that end, FIG. 6 depicts a resulting rank matrix 90 based on the thirteen observed behavior pairs and eighteen signal generators each capable of producing an affect score for each behavior, in accordance with an embodiment. As depicted, the diagonal 92 across the rank matrix includes fairly consistent rank values close to 1.

Figure 7:
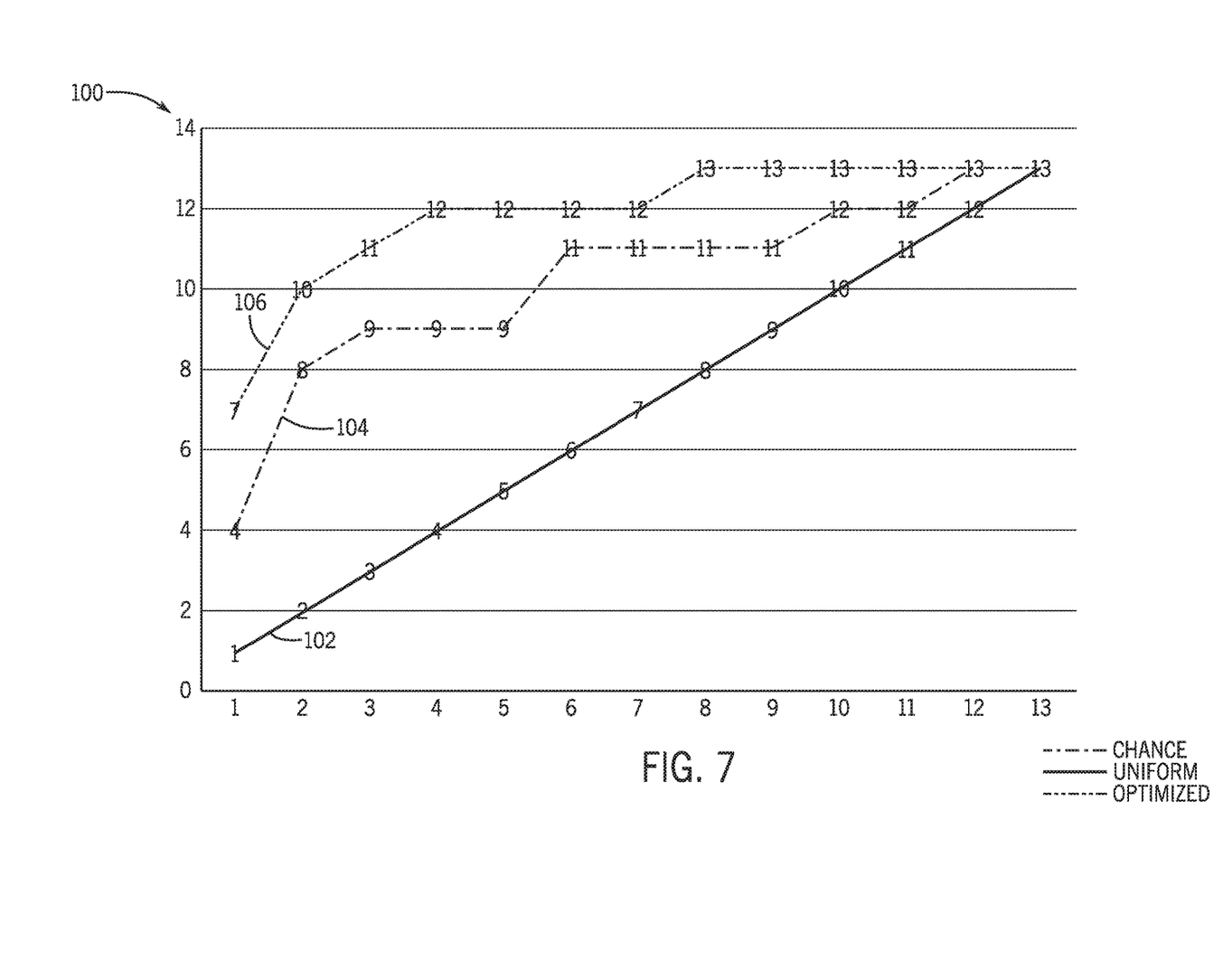
FIG. 7 is a cumulative match characteristic curve for various one shot learning experiments, in accordance with an embodiment.

FIG. 7 is a cumulative match characteristic (CMC) curve 100 for the above-described one shot learning experiments, in accordance with an embodiment. The Y value of the CMC curve 100 may represent the number of correct matches with rankings of X or better. An optimal CMC curve 100 is a straight line with Y equal to thirteen for all X. Curve 102 represents performance that would be expected using chance alone, curve 104 represents performance observed using a uniform weighting function w (each signal generators contributing equally), and curve 106 represents performance observed using an optimized weighting function w. As depicted the performance of the one shot learning techniques (e.g., curve 104 and curve 106) is sub-optimal but better than chance.

The CMC curve 100 captures pairwise match scores that were calculated using the following distance scores:

$$d(b_k, b_j) = \Sigma_i^n w_i \|sg_i(b_k) - sg_i(b_j)\|$$ (Equation 1)

Where d is a distance measure, b is an observed behavior, sg is a signal generator, n is the number of signal generators and w is a weight associated with each signal generator. For the initial experiments the weighting function w was set to uniform values, which resulted in all signal generators contributing equally to the distance metric. Given such a distance metric, the pairwise match scores were computed and the rank of all true matches were measured. Additional matching results were computed for an optimized weighting function.

The experiments were performed to determine whether true match performance could be improved by adjusting the weight w associated with each signal generator. To this end, an overall performance metric was defined as the average rank associated with the true matches. Since the surface associated with this performance measure as a function of w is non-convex, a random number generator was used to probe the search space. An experiment consisting of one thousand trials each representing a randomly generated weighting vector w was performed. The average true rankings for w, with uniform values, was observed to be 3.7. After the one thousand trial search, this value was reduced to 2.1. As can be seen from the CMC curve 100, the number of true matches with rank 1 went from 4 to 7. The optimized method resulted in approximately half of the behaviors receiving a top match with its true match. By contrast, if a completely random matching function was used, just 1 out of 13 behaviors would be expected to receive a top ranking for its true match.

Technical effects of the invention include instantiating a one shot learning framework for behavior recognition. Given a single observation of an instance of a query behavior (e.g., loitering), the social behavior recognition system 10 may classify any subsequent observations as being either another example of this class or not. Thus, the social behavior recognition system 10 may be trained with a nominal (e.g., single instance) amount of data. The social behavior recognition system 10 may take any pair of observed behaviors and determine whether the two behaviors match. The social behavior recognition system 10 may use various cameras 12 that are not borne by any individuals (e.g., located remote from the people 14). The cameras 12 may be used to capture and analyze non-verbal cues (e.g., emotional affect, proximity, activity/motion, engagement) of persons 14 in crowd/group level interactions.

This written description uses examples to disclose the embodiments, including the best mode, and also to enable any person skilled in the art to practice the disclosed subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   receiving data from one or more cameras in an environment;
   generating metadata of one or more video analytics streams produced from the data;
   generating one or more time series of values based on the metadata;
   generating one or more affect scores for the one or more time series;
   generating a first signature representative of an observed behavior based on the one or more affect scores;
   performing pairwise matching by determining whether the first signature matches a second signature indicative of a query behavior; and
   performing an action when the first signature matches the second signature.

2. The method of claim 1, wherein the pairwise matching is performed after only a single observation of an instance of the query behavior is obtained.

3. The method of claim 1, wherein pairwise matching comprises deriving pairwise match scores in accordance with the following representation:

$$d(b_k, b_j) = \sum_i^n w_i \|sg_i(b_k) - sg_i(b_j)\|$$

where d is a distance measure, b is an observed behavior, sg is a signal generator, n is a number of signal generators, and w is a weight associated with each signal generator.

4. The method of claim 1, wherein the one or more cameras comprise red, green, blue, depth (RGB+D) cameras that capture estimates of location and articulated body motion, and fixed cameras and pan tilt zoom (PTZ) cameras that capture facial imagery.

5. The method of claim 1, wherein the video analytics stream comprises a set of person descriptors that encode locations of individuals in site coordinates, motion signatures of the individuals, expression profiles of the individuals, gaze direction of the individuals, or some combination thereof.

6. The method of claim 1, wherein the video analytics stream is produced by:
   tracking individuals via the one or more cameras,
   generating a motion signature for each individual based on space-time interest points;
   capturing facial images using the one or more cameras; and
   estimating facial expression and gaze direction based on the facial images.

7. The method of claim 1, wherein the values in the time series range from 0 to 1.

8. The method of claim 1, wherein the one or more affect scores range from 0 to 1.

9. The method of claim 1, wherein the generation of the metadata, the one or more time series of values, the one or more affect scores, and the signature are performed by a signal generator bank module.

10. The method of claim 1, wherein performing the action comprising sounding an alarm, calling emergency services, triggering an alert, sending a message, displaying an alert, or some combination thereof when the first signature matches the second signature.

11. The method of claim 1, comprising determining weights used to generate the one or more affect scores by performing machine learning on a training set of pairs of behaviors that are labeled as positive matches and pairs of behaviors that are labeled as negative matches.

12. One or more tangible, non-transitory computer-readable media storing computer instructions that, when executed by one or more processors, cause the one or more processors to:
   receive data from one or more cameras in an environment;
   generate metadata of one or more video analytics streams produced from the data;
   generate one or more time series of values based on the metadata;
   generate one or more affect scores for the one or more time series;
   generate a first signature representative of an observed behavior based on the one or more affect scores;
   perform pairwise matching by determining whether the first signature matches a second signature indicative of a query behavior; and
   provide an output when the first signature matches the second signature indicative of the query behavior.

13. The one or more computer-readable media of claim 12, wherein the pairwise matching is performed after only a single observation of an instance of the query behavior is obtained.

14. The one or more computer-readable media of claim 12, wherein the computer instructions cause the one or more processors to produce the video analytics stream by:
   tracking individuals via the one or more cameras,
   generating a motion signature for each individual based on space-time interest points;
   capturing facial images using the one or more cameras; and
   estimating facial expression and gaze direction based on the facial images.

15. The one or more computer-readable media of claim 12, wherein pairwise matching comprises deriving pairwise match scores in accordance with the following representation:

$$d(b_k, b_j) = \sum_i^n w_i \|sg_i(b_k) - sg_i(b_j)\|$$

where d is a distance measure, b is an observed behavior, sg is a signal generator, n is a number of signal generators, and w is a weight associated with each signal generator.

16. The one or more computer-readable media of claim 12, wherein the values in the time series range from 0 to 1, and the one or more affect scores range from 0 to 1.

17. A system, comprising:
one or more cameras that capture data related to a behavior of one or more individuals in an environment;
one or more computing devices comprising one or more processors that:
receive the data from the one or more cameras;
generate metadata of one or more video analytics streams produced from the data;
generate one or more time series of values based on the metadata;
generate one or more affect scores for the one or more time series;
perform one shot learning using the data to determine whether an observed behavior determined based on the one or more affect scores related to the one or more individuals matches a query behavior, wherein one shot learning comprises performing pairwise matching that is performed after only a single observation of an instance of the query behavior is obtained; and
perform an action when the observed behavior matches the query behavior.

18. The system of claim 17, wherein the one or more cameras comprise red, green, blue, depth (RGB+D) cameras that capture estimates of location and articulated body motion, and fixed cameras and pan tilt zoom (PTZ) cameras that capture facial imagery.

19. The system of claim 17, wherein the one or more computing devices comprise a smartphone, a smartwatch, a tablet, a laptop computer, a desktop computer, a server in a cloud-based computing system, or some combination thereof.

20. The system of claim 17, wherein the action comprises sounding an alarm, calling emergency services, triggering an alert, sending a message, displaying an alert, or some combination thereof.

* * * * *